US010661855B2

(12) United States Patent
McDonald et al.

(10) Patent No.: US 10,661,855 B2
(45) Date of Patent: May 26, 2020

(54) BICYCLE SUSPENSION WITH SHOCK STRUT

(71) Applicant: SPECIALIZED BICYCLE COMPONENTS, INC., Morgan Hill, CA (US)

(72) Inventors: Jason McDonald, Morgan Hill, CA (US); Jason Chamberlain, Morgan Hill, CA (US); Daniel Lentz, Morgan Hill, CA (US)

(73) Assignee: SPECIALIZED BICYCLE COMPONENETS, INC., Morgan Hill, CA (US)

( * ) Notice: Subject to any disclaimer, the term of this patent is extended or adjusted under 35 U.S.C. 154(b) by 149 days.

(21) Appl. No.: 15/881,320

(22) Filed: Jan. 26, 2018

(65) Prior Publication Data

US 2019/0233046 A1 Aug. 1, 2019

(51) Int. Cl.
| | | |
|---|---|---|
| B62K 25/00 | (2006.01) | |
| B62K 25/10 | (2006.01) | |
| B62K 25/28 | (2006.01) | |
| B62K 3/02 | (2006.01) | |
| B62M 9/00 | (2006.01) | |

(52) U.S. Cl.
CPC ............... *B62K 25/10* (2013.01); *B62K 3/02* (2013.01); *B62K 25/286* (2013.01); *B62K 2201/08* (2013.01); *B62M 9/00* (2013.01)

(58) Field of Classification Search
CPC ........ B62K 25/00; B62K 25/20; B62K 25/26; B62K 25/286
See application file for complete search history.

(56) References Cited

U.S. PATENT DOCUMENTS

| | | |
|---|---|---|
| 494,803 A | 4/1893 | Cable |
| 5,121,937 A | 6/1992 | Lawwill |
| 5,509,676 A | 4/1996 | Fukutake et al. |
| 5,658,001 A | 8/1997 | Blanchard |

(Continued)

OTHER PUBLICATIONS

"First Ride Review: Orbea Rallon 5—returning to the weapons industry", prior art webpage, published Jun. 26, 2017, https://enduro-mtb.com/en/first-ride-review-orbea-rallon-5/, Enduro Mountainbike Magazine, (14 pages).

(Continued)

*Primary Examiner* — Tony H Winner
(74) *Attorney, Agent, or Firm* — Micheal Best & Friedrich LLP

(57) ABSTRACT

A bicycle comprises a main frame defining a spring mount, a pivot mount, and a reinforcing strut substantially directly connecting the spring mount to the pivot mount. The reinforcing strut is asymmetrically positioned on one side of the central plane. A rear frame is movable relative to the main frame, a pivot link couples the main frame to the rear frame, and a spring assembly couples a portion of the pivot link to the main frame. The pivot link comprises a left link member, a right link member, and a link bridge connecting the left link member to the right link member. Preferably, the link bridge is positioned rearward of a seat tube on the main frame. The rear frame comprises a seatstay bridge connecting a left and right seatstays. The main frame can support a crank assembly having a chainring offset from the central plane on the same side as the reinforcing strut.

20 Claims, 5 Drawing Sheets

(56) References Cited

U.S. PATENT DOCUMENTS

| | | | |
|---|---|---|---|
| 5,957,473 | A | 9/1999 | Lawwill |
| 6,270,103 | B1 | 8/2001 | Grimm |
| 6,886,846 | B2 | 5/2005 | Carroll |
| 7,350,797 | B2 | 4/2008 | Carroll |
| 7,377,535 | B2 | 5/2008 | CHamberlain |
| 7,438,149 | B2 | 10/2008 | Ishida et al. |
| 7,963,541 | B2 | 6/2011 | Chamberlain |
| 8,602,435 | B2 | 12/2013 | Dodman et al. |
| 8,998,235 | B2 | 4/2015 | Beale |
| 9,334,011 | B2 | 5/2016 | Chamberlain |
| 9,376,156 | B2 | 6/2016 | Chamberlain |
| 2003/0193163 | A1 | 10/2003 | Chamberlain et al. |
| 2005/0046142 | A1 | 3/2005 | Chamberlain |
| 2007/0096426 | A1 | 5/2007 | McAndrews |
| 2009/0243252 | A1 | 10/2009 | Sherman |
| 2010/0276906 | A1 | 11/2010 | Galasso et al. |
| 2010/0327554 | A1 | 12/2010 | Talavasek |
| 2012/0061933 | A1 | 3/2012 | Weagle |
| 2012/0235379 | A1 | 9/2012 | Trimble et al. |
| 2017/0151996 | A1 | 6/2017 | Southall |
| 2019/0031278 | A1* | 1/2019 | Lauer .................. B62K 25/286 |

OTHER PUBLICATIONS

European Patent Office Search Report for Application No. 19152289.5-1013 dated May 29, 2019 (9 pages).

* cited by examiner

BICYCLE SUSPENSION WITH SHOCK STRUT

BACKGROUND

The present invention relates generally to the field of bicycles and specifically to bicycle frames having a rear suspension.

Many modern bicycles have resilient suspension systems that facilitate a smoother ride over rough terrain. For example, some bicycles include a rear frame that is pivotally attached to a main frame, and shocks (e.g., springs or dampers) that cushion the rear end of the bicycle. Many rear suspension systems on existing bicycles have a single-pivot design (i.e. pivotable about a single pivot point) or a linkage-pivot design (typically a four-bar linkage). These designs provide vertical compliance to the rear wheel such that the rear wheel can absorb impacts and thus reduce transmission of the impacts to the main frame. Although providing vertical compliance on certain bicycles is desirable, it is generally preferred that lateral and torsional stiffness of the frame be maintained or increased.

SUMMARY

The invention provides a bicycle frame that has a rear suspension, but also enhances lateral or torsional stiffness of the frame.

The present invention provides a bicycle comprising front and rear wheels (the rear wheel defining a central plane of the bicycle) and a frame assembly supported by the front and rear wheels. The frame assembly includes a main frame defining a spring mount, a pivot mount, and a reinforcing strut substantially directly connecting the spring mount to the pivot mount. The reinforcing strut is asymmetrically positioned on one side of the central plane, and there is no other corresponding reinforcing strut on another side of the frame opposite the one side. The frame assembly further includes a rear frame movable relative to the main frame, a pivot link coupling the main frame to the rear frame, and a spring assembly coupling a portion of the pivot link to the main frame at the spring mount. The pivot link is pivotally coupled to the main frame at the pivot mount. The pivot link comprises a left link member, a right link member, and a link bridge connecting the left link member to the right link member to form a substantially rigid link structure. Preferably, the main frame includes a seat tube adapted to receive and support a seat post, and the link bridge is positioned rearward of the seat tube.

In one embodiment, the rear frame comprises a left seatstay, a right seatstay, and a seatstay bridge connecting the left seatstay to the right seatstay to form a substantially rigid seatstay structure. The upper ends of the seatstays preferably include narrowed tabs that are positioned between the left and right link members.

The spring assembly can include a spring member and a yoke member connecting the spring member to the link members. Preferably, the yoke member comprises a split rear end positioned between the left and right link members.

The main frame can include a bottom bracket, that rotationally supports a crank assembly having a crank arm and a chainring offset from the central plane on the same side as the reinforcing strut.

In order to provide for remote actuation of a remote mechanism (e.g., a rear derailleur or a rear brake, the bicycle can further include an actuator assembly, such as a cable and housing, hydraulic fluid in a hose, or an electric wire in an insulator. In this situation, it is preferred that the actuator assembly is positioned in the reinforcing strut.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
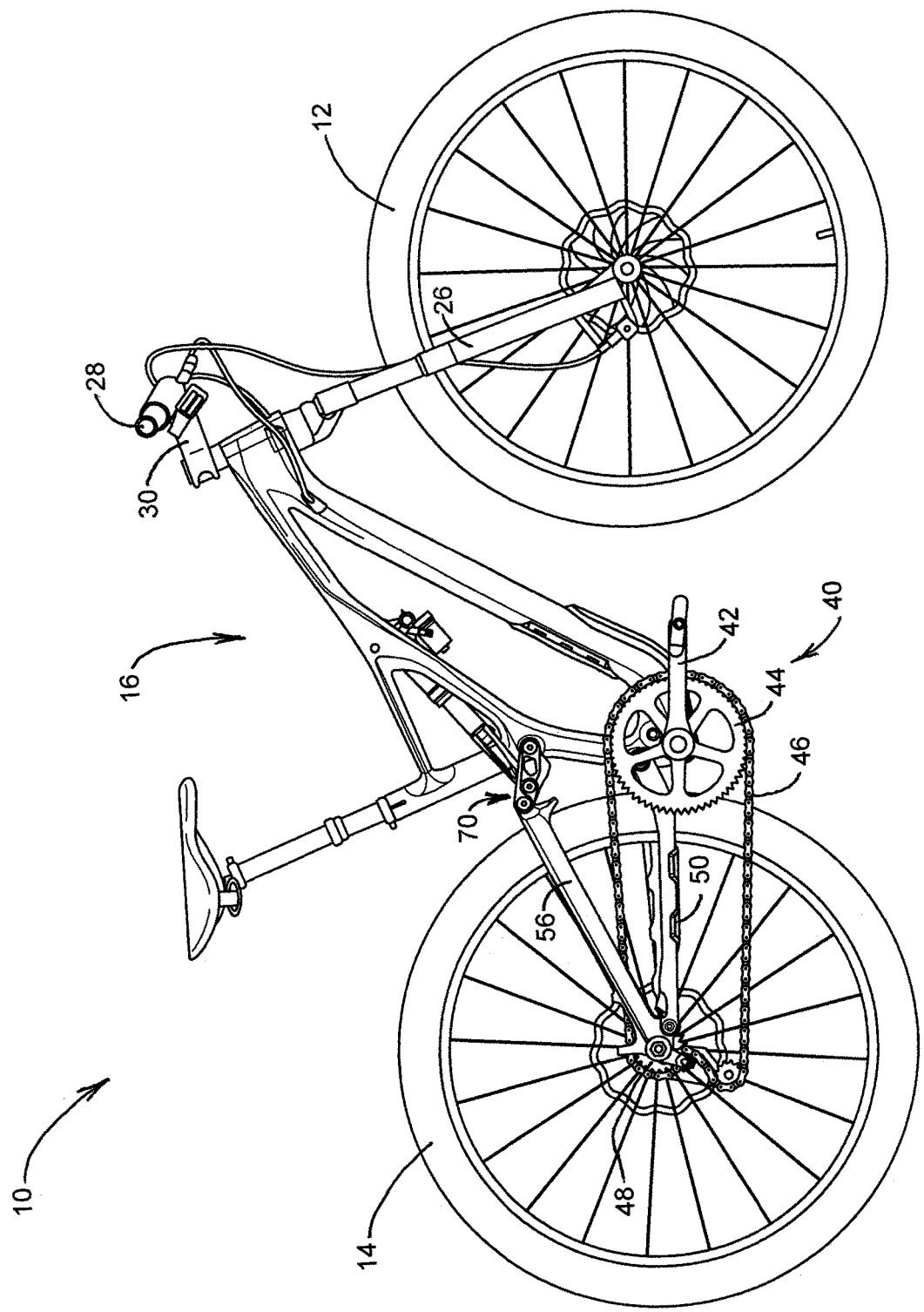
FIG. 1 is a side view of a bicycle having a frame assembly embodying the present invention.
Figure 2:
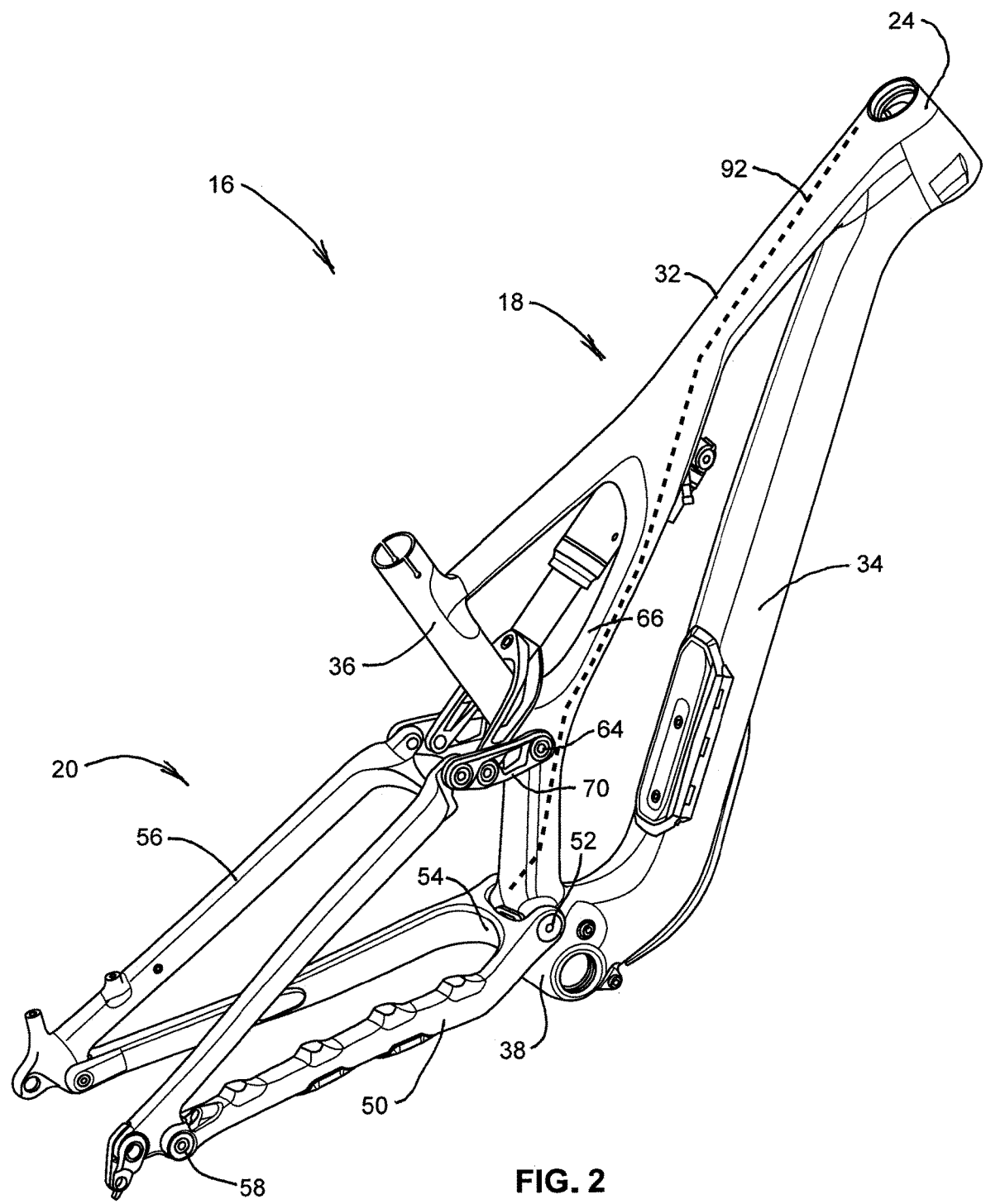
FIG. 2 is a perspective view of the frame assembly of FIG. 1.

FIG. 1 shows a bicycle 10 that includes a front wheel 12, a rear wheel 14, and a frame assembly 16 that has a main frame 18 and a rear frame 20. The rear wheel 14 defines a central plane 22 of the bicycle 10. The main frame 30 has a head tube 24, and a front fork 26 is rotationally supported by the head tube 24 and secures the front wheel 12 to the main frame 18. A handlebar assembly 28 is coupled to the head tube 24 and is secured to the front fork 26 by a stem assembly 30 such that movement of the handlebar assembly 28 results in movement of the stem assembly 30 and the fork 26.

The main frame 18 also includes a top tube 32, a down tube 34, a seat tube 36, and a bottom bracket 38. The bottom bracket 38 rotationally supports a crank assembly 40 having right and left crank arms 42 and a chainring 44 on the right side of the central plane 22. The chainring 44 drives a chain 46, which provides motion to a rear cog 48 on the rear wheel 14.

The rear frame 20 includes left and right chainstays 50 pivotally coupled to the main frame 18 at a lower pivot mount 52. A chainstay bridge 54 connects the left and right chainstays 50 to form a substantially rigid chainstay structure. The rear frame 20 further includes left and right seatstays 56 pivotally coupled to the chainstays 50 at a rear pivot mount 58. A seatstay bridge 60 connects upper ends of the seatstays 56 to form a substantially rigid seatstay structure. The chainstays 50 and seatstsays 56 cooperate to couple the rear wheel 14 to the main frame 18.

The top tube 32 supports a front spring mount 62, the seat tube 36 supports an upper pivot mount 64, and the main frame 18 further includes a reinforcing strut 66 substantially directly connecting the spring mount 62 to the pivot mount 64. The reinforcing strut 66 is offset to the same side of the central plane 22 as the chainring 44, which is the right side in the illustrated embodiment.

The frame assembly 16 further includes a pivot link 70 having a front end that is pivotally coupled to the main frame

18 at the upper pivot mount 64. A rear end of the pivot link 70 is pivotally coupled to an upper end of the seatstays 56. Specifically, referring to FIG. 5, the upper ends of the seatstays 56 include narrowed tabs 72 that fit between left and right link members 74,76, and the seatstay bridge 60 is positioned adjacent to and slightly rearward of the narrowed tabs 72.

Figure 6:
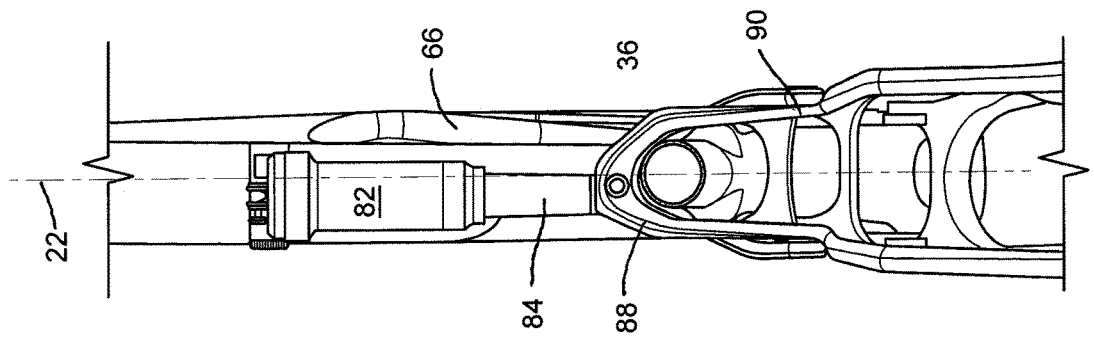
FIG. 6 is an upper view of the frame assembly of FIG. 2 taken along line 6-6 in FIG. 4.
Figure 5:
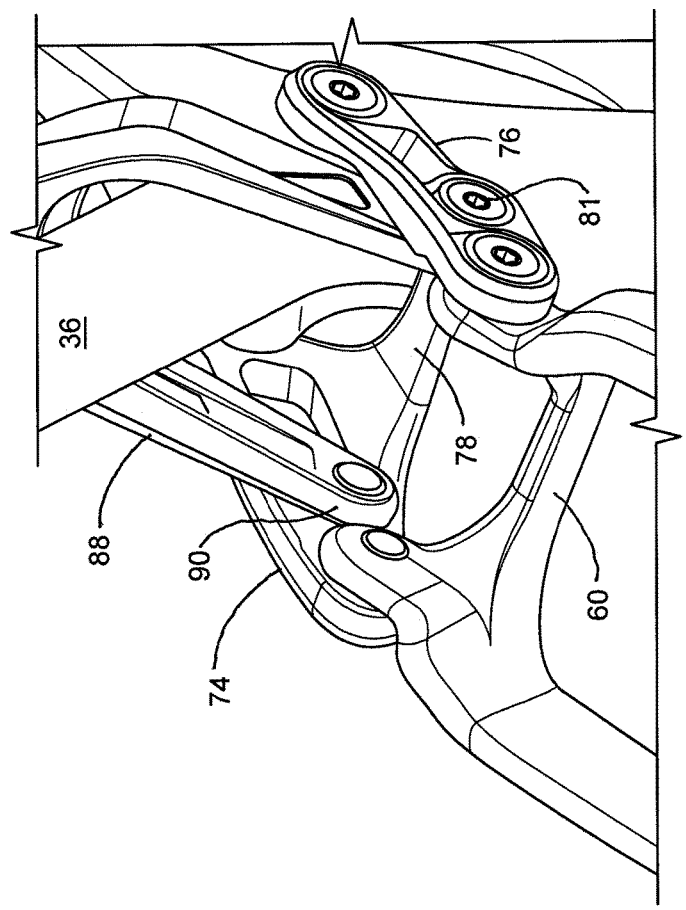
FIG. 5 is an enlarged perspective view of a pivot link, yoke, and seatstay bridge on the frame assembly of FIG. 2.

The pivot link 70 comprises a link bridge 78 connecting the left link member 74 to the right link member 76 to form a substantially rigid link structure. This connection can be accomplished in a variety of ways, such as by welding, fastening, or forming as a unitary component such as by casting or forging. As best shown in FIGS. 5 and 6, when the pivot link 70 is secured to the seat tube 36, the link bridge 78 is positioned rearward of the seat tube 36.

The above-described and illustrated structural arrangement provides a four-bar linkage with the four links being provided by the pivot link 70, the seatstays 56, the chainstays 50, and the seat tube 36 (between the upper pivot mount and the lower pivot mount).

The frame assembly 16 further includes a spring assembly 80 connected between the main frame 18 and the pivot link 70, and specifically between the front spring mount 62 and a rear spring mount 81 on the pivot link 70. The spring assembly 80 includes a spring housing 82, a spring rod 84 slidable relative to the spring housing 82, a spring member (not shown) positioned in the spring housing 82 to bias the spring rod 84 toward an extended position, and a yoke member 88 connecting the spring rod 84 to the rear spring mount 81 on the pivot link 70. The yoke member 88 comprises a split rear end 90 positioned between the left and right link members 74,76.

Figure 3:
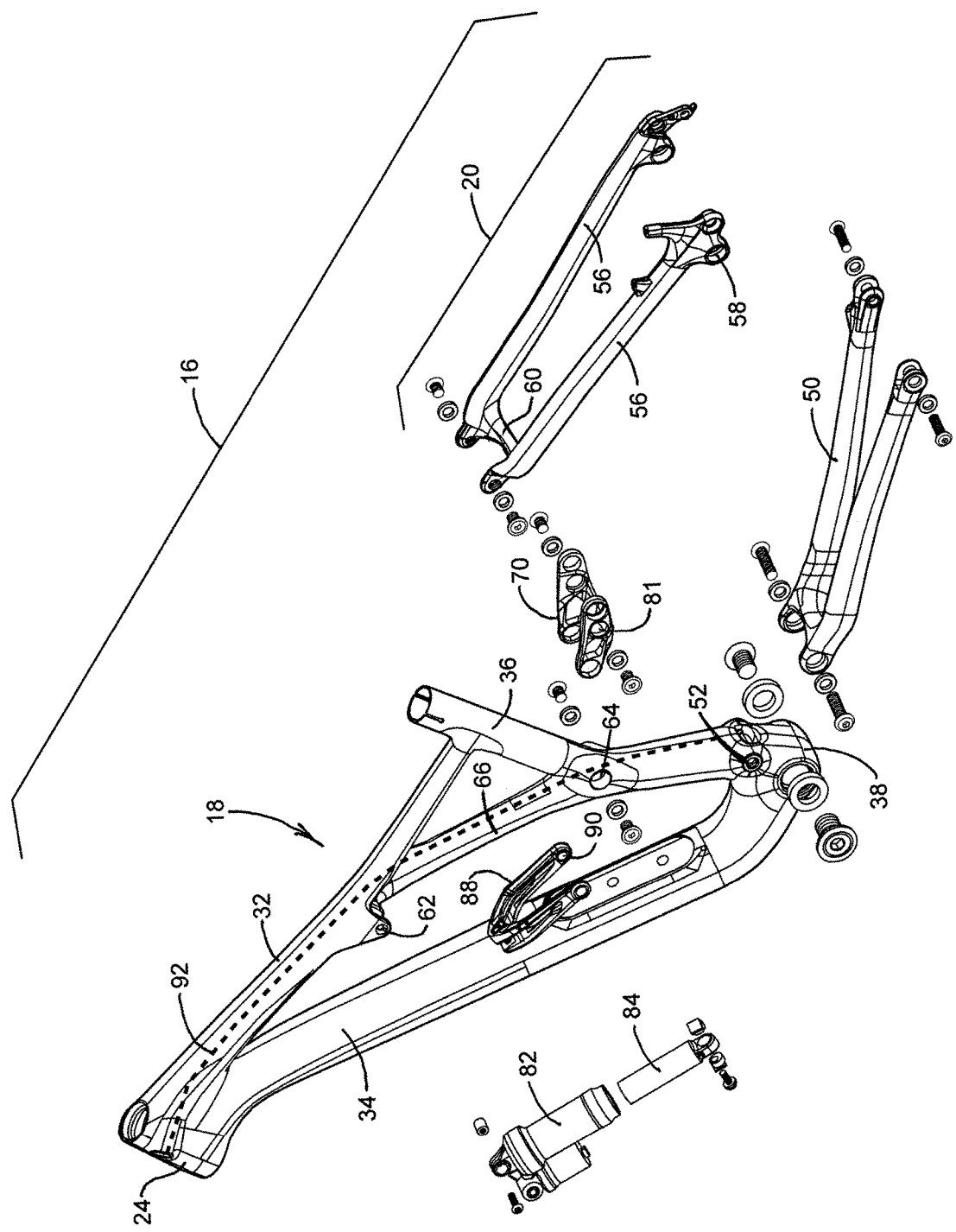
FIG. 3 is an exploded view of the frame assembly of FIG. 2.
Figure 4:
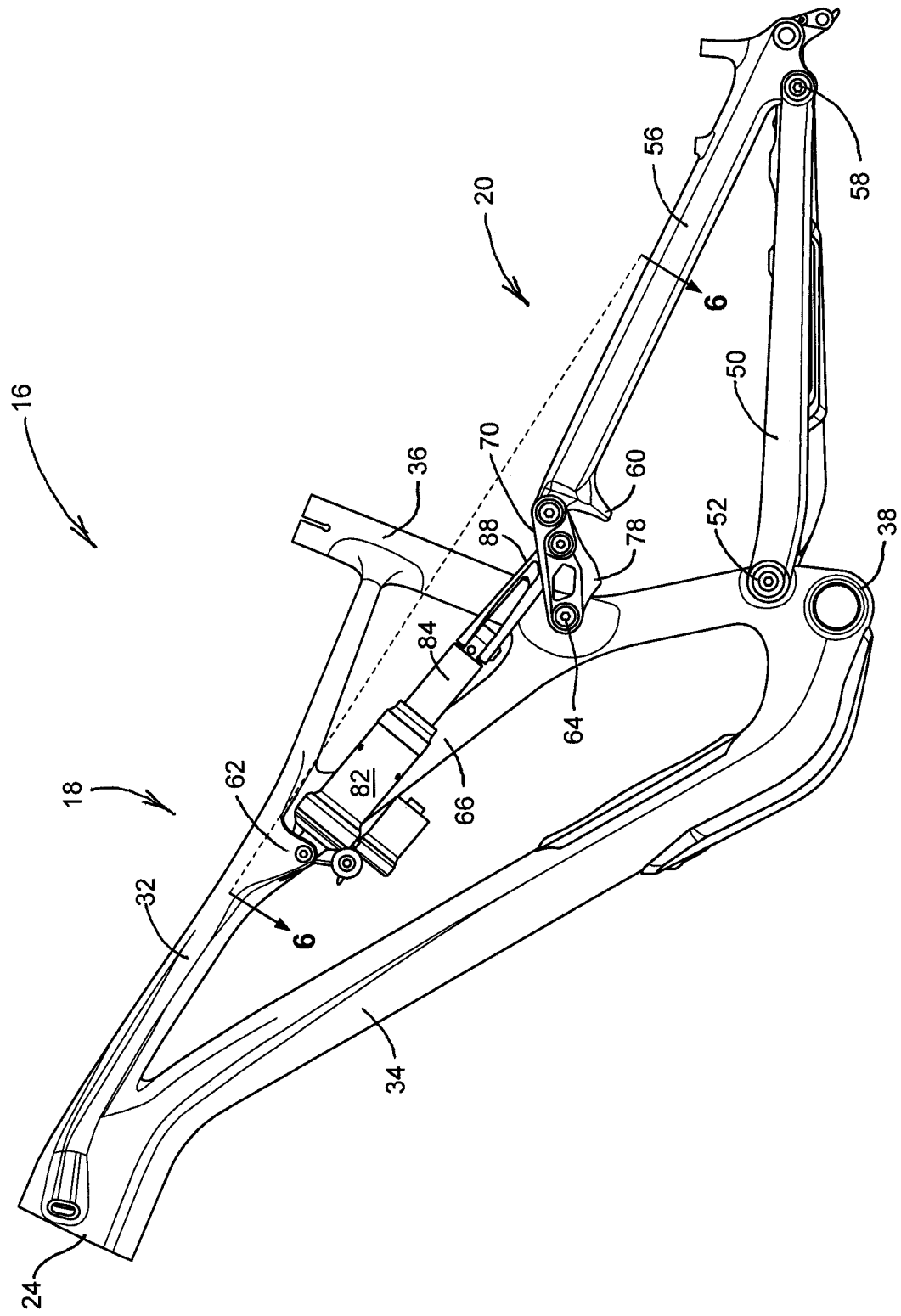
FIG. 4 is a left side view of the frame assembly of FIG. 2.

Referring to FIG. 3, the bicycle further includes an actuating assembly 92 for actuating a remote mechanism from an actuating lever on the handlebars 28. Specifically, the actuating assembly 92 can comprise a brake actuator for actuating a rear brake mechanism or a derailleur actuator for actuating a derailleur mechanism on the bicycle. The above-referenced actuating assemblies can comprise mechanical cables in a cable housing, hydraulic fluid in a hydraulic hose, electrical wiring in an insulated sheath, or any other suitable assembly for remotely actuating a remote mechanism. In the illustrated embodiment, the actuating assembly 92 is shown in a broken line and positioned inside the main frame 18. Specifically, it follows a path through a portion of the top tube 32, the reinforcing strut 66, and the seat tube 36.

Various features and advantages of the invention are set forth in the following claims.

The invention claimed is:

1. A bicycle comprising:
a front wheel and a rear wheel, the rear wheel defining a central plane of the bicycle; and
a frame assembly supported by the front wheel and the rear wheel, the frame assembly including:
a main frame defining a spring mount, a pivot mount, and a reinforcing strut directly connecting the spring mount to the pivot mount, the reinforcing strut being asymmetrically positioned on one side of the central plane and wherein there is no other corresponding reinforcing strut on an other side of the central plane opposite the one side;
a rear frame movable relative to the main frame;
a pivot link coupling the main frame to the rear frame, the pivot link being pivotally coupled to the main frame at the pivot mount, wherein the pivot link comprises:
a left link member;
a right link member; and
a link bridge connecting the left link member to the right link member to form a substantially rigid link structure;
and
a spring assembly coupling a portion of the pivot link to the main frame, the spring assembly being coupled to the main frame at the spring mount.

2. The bicycle of claim 1, wherein the main frame includes a seat tube adapted to receive and support a seat post, and wherein the link bridge is positioned rearward of the seat tube.

3. The bicycle of claim 1, wherein the rear frame comprises:
a left seatstay;
a right seatstay; and
a seatstay bridge connecting the left seatstay to the right seatstay to form a substantially rigid seatstay structure.

4. The bicycle of claim 3, wherein the left seatstay and right seatstay are positioned between the left link member and the right link member.

5. The bicycle of claim 1, wherein the spring assembly comprises a spring member and a yoke member coupling the spring member to the left link member and the right link member.

6. The bicycle of claim 5, wherein the yoke member comprises a split rear end positioned between the left link member and the right link member.

7. The bicycle of claim 5, wherein the yoke member is asymmetric about the central plane.

8. The bicycle of claim 1, further comprising an actuator assembly positioned in or adjacent the reinforcing strut.

9. The bicycle of claim 8, wherein the actuator assembly comprises at least one of a cable housing, a hydraulic hose, or an electric wire.

10. The bicycle of claim 1, wherein the main frame includes a bottom bracket, and wherein the bicycle further comprises a crank assembly mounted for rotation to the bottom bracket, the crank assembly including a crank arm and a chainring offset from the central plane on the one side of the central plane.

11. A bicycle frame assembly comprising:
a main frame defining a spring mount, a pivot mount, and a reinforcing strut directly connecting the spring mount to the pivot mount;
a rear frame movable relative to the main frame;
a pivot link coupling the main frame to the rear frame, the pivot link being pivotally coupled to the main frame at the pivot mount, wherein the pivot link comprises:
a left link member;
a right link member; and
a link bridge connecting the left link member to the right link member to form a substantially rigid link structure;
and
a spring assembly coupling a portion of the pivot link to the main frame, the spring assembly being coupled to the main frame at the spring mount.

12. The bicycle frame assembly of claim 11, wherein the rear frame comprises:
a left seatstay;
a right seatstay; and
a seatstay bridge connecting the left seatstay to the right seatstay to form a substantially rigid seatstay structure.

13. The bicycle frame assembly of claim 12, wherein the left seatstay and the right seatstay are positioned between the left link member and the right link member.

14. The bicycle frame assembly of claim 11, further comprising a yoke member connecting the spring assembly to the left link member and the right link member.

15. The bicycle frame assembly of claim 14, wherein the yoke member comprises a split rear end positioned between the left link member and the right link member.

16. The bicycle frame assembly of claim 11, wherein the main frame includes a seat tube adapted to receive and support a seat post, and wherein the link bridge is positioned rearward of the seat tube.

17. The bicycle frame assembly of claim 11, further comprising an actuator assembly positioned in or adjacent the reinforcing strut.

18. The bicycle frame assembly of claim 17, wherein the actuator assembly comprises at least one of a cable housing, a hydraulic hose, or an electric wire.

19. The bicycle frame assembly of claim 11, wherein:
the bicycle frame assembly is configured to support a rear wheel defining a central plane of a bicycle;
the reinforcing strut is asymmetrically positioned on one side of the central plane when the bicycle frame assembly is supporting the rear wheel;
the main frame includes a bottom bracket; and
a crank assembly is mounted for rotation to the bottom bracket, the crank assembly including a crank arm and a chaining offset from the central plane on the one side of the central plane.

20. The bicycle frame assembly of claim 16, wherein there is no other corresponding reinforcing strut on another side of the central plane opposite the one side when the bicycle frame assembly is supporting the rear wheel.

* * * * *